US006045937A

United States Patent [19]
Kolb et al.

[11] Patent Number: 6,045,937
[45] Date of Patent: Apr. 4, 2000

[54] ELECTROCHEMICAL CELL HAVING A CONTROLLED ELECTRODE SURFACE AND ASSOCIATED FABRICATION AND CHEMICAL PROCESS

[75] Inventors: Eric S. Kolb, Acton; Martin Van Buren, Chelmsford; Denis G. Fauteux, Acton, all of Mass.

[73] Assignee: Mitsubishi Chemical Corporation, Tokyo, Japan

[21] Appl. No.: 09/178,846

[22] Filed: Oct. 26, 1998

Related U.S. Application Data

[63] Continuation-in-part of application No. 08/812,021, Mar. 6, 1997, Pat. No. 5,853,917.
[51] Int. Cl.⁷ .................................................. H01M 10/34
[52] U.S. Cl. ................... 429/59; 57/101; 57/105; 57/324; 57/325; 57/331; 57/231.9; 57/231.95
[58] Field of Search ................... 429/248, 57, 59, 429/101, 105, 324, 325, 331, 231.9, 231.95

[56] References Cited

U.S. PATENT DOCUMENTS 5,529,859 6/1996 Shu et al. ............................. 429/194
5,626,981 5/1997 Simon et al. ......................... 429/105

FOREIGN PATENT DOCUMENTS 7-220756 8/1995 Japan .
8-273700 10/1996 Japan .

*Primary Examiner*—Bruce F. Bell
*Attorney, Agent, or Firm*—Factor and Shaftal

[57] ABSTRACT

An electrochemical cell, and an associated process, wherein the cell includes a controlled electrode surface comprising an electrode with a carbonaceous surface, an electrolyte and a reduced additive. The reduced additive is formulated from an additive which is either soluble or insoluble in the solvated electrolyte prior to reduction. The invention further includes a passivating layer at the carbonaceous electrode/ electrolyte interface. The passivating layer includes the additive and/or the reduced additive. This passivating layer substantially precludes contact between electrolyte solvent and the carbonaceous surface of the electrode to, in turn, substantially prevent gas formation within the cell, which would otherwise result from decomposition of the solvent upon contact with the carbonaceous surface. Also, the additive and/or the reduced additive will likewise be substantially precluded from generating a gas upon its decomposition.

17 Claims, 3 Drawing Sheets

6,045,937

ELECTROCHEMICAL CELL HAVING A CONTROLLED ELECTRODE SURFACE AND ASSOCIATED FABRICATION AND CHEMICAL PROCESS

This is a Continuation-In-Part of U.S. patent application Ser. No. 08/812,021, filed Mar. 6, 1997, now U.S. Pat. No. 5,853,917 the entirety of which is incorporated herein by reference.

BACKGROUND OF THE INVENTION

1. Field of the Invention

The present invention relates in general to secondary electrochemical cells, and more particularly, to lithium ion electrochemical cells and associated fabrication and chemical processes utilizing an in situ reduced additive which precludes gas formation within the cell as a result of decomposition of solvents used in association with the electrolyte, and, wherein the additive itself does not form a gas from its own decomposition during cell cycling and storage.

2. Background Art

Lithium ion batteries have been known in the art for several years. Furthermore, lithium ion batteries using liquid, gel, polymer, or plastic electrolytes which utilize carbonaceous electrodes are likewise well known. While such electrolytes have been readily utilized, problems have been identified with respect to commercial solvents, utilized within the electrolyte, decomposing during cell cycling and storage. In particular, without the presence of at least a conventional additive within the cell to form a passivating layer, the solvent reacts with the electrode interface and partially decomposes during an initial charge. Such a decomposition results in the formation of gas which adversely affects the cell's electrochemical performance.

Although conventional additives have been used to form a passivating layer which substantially blocks the solvent from contact with the carbonaceous electrode, problems nevertheless persist. Specifically, the additive itself undergoes decomposition during cell cycling and storage, and, such decomposition likewise results in the generation of significant amounts of gas within the cell.

SUMMARY OF THE INVENTION

The present invention is directed to an electrochemical cell having a controlled electrode surface comprising a first electrode and a second electrode wherein at least one of the first and second electrodes includes a carbonaceous surface, an electrolyte including at least one solvent, and, a reduced additive associated with the carbonaceous surface of at least one of the first and second electrodes. The reduced additive is substantially insoluble in the electrolyte and is reduced in situ. Furthermore, the reduced additive includes an additive which is either soluble or insoluble in the electrolyte prior to reduction.

The invention also includes passivating means including at least one of the additive and reduced additive for substantially precluding contact between the solvent of the electrolyte and the carbonaceous surface of an associated electrode to, in turn, substantially prevent gas formation within the cell, which would otherwise result from decomposition of the solvent upon contact with the carbonaceous surface. Means are associated with at least one of the additive and reduced additive for substantially precluding gas formation within the electrochemical cell as a result of decomposition of the additive or reduced additive at the electrode with the carbonaceous surface during cell cycling and storage.

In a preferred embodiment of the invention, the electrochemical cell exhibits a first cycle coulombic efficiency greater than 23%.

In another preferred embodiment of the invention, the reduced additive includes a multi-dentate complex with at least one metal cation. In this embodiment the at least one metal cation is preferably $Li^+$.

The present invention is also directed to a process for manufacturing an electrochemical cell comprising the steps of: a) fabricating a first and a second electrode wherein at least one of the electrodes includes a carbonaceous surface; b) associating at least one electrolyte, having at least one solvent, with the first and second electrodes; and c) associating either an insoluble or soluble additive with at least one of the electrolyte or the at least one electrode with the carbonaceous surface, wherein the additive is insoluble with the electrolyte in its reduced state.

In a preferred embodiment of the process, the manufactured electrochemical cell exhibits a first cycle coulombic efficiency greater than 23%.

The present invention is also directed to a chemical process for an electrochemical cell comprising the steps of: a) fabricating a first and a second electrode wherein at least one of the electrodes includes a carbonaceous surface; b) associating at least one electrolyte, having at least one solvent, with the first and second electrodes; c) associating either an insoluble or soluble additive with at least one of the electrolyte or the at least one electrode with the carbonaceous surface, wherein the additive is insoluble with the electrolyte in its reduced state; and d) forming a passivating layer between the carbonaceous surface of the at least one electrode and the electrolyte; wherein the step of forming the passivating layer includes the steps of: 1) charging the electrochemical cell; 2) reducing the additive at the carbonaceous surface so that the reduced additive is substantially insoluble with the electrolyte; 3) blocking the at least one solvent in the electrolyte from chemical interaction with the carbonaceous surface of the at least one electrode; and 4) substantially precluding gas formation within the electrochemical cell as a result of decomposition of at least one of the additive and reduced additive during cell cycling and storage.

BRIEF DESCRIPTION OF THE DRAWINGS

The invention will now be described with reference to the drawings wherein.

DETAILED DESCRIPTION OF THE DRAWINGS

Figure 1:
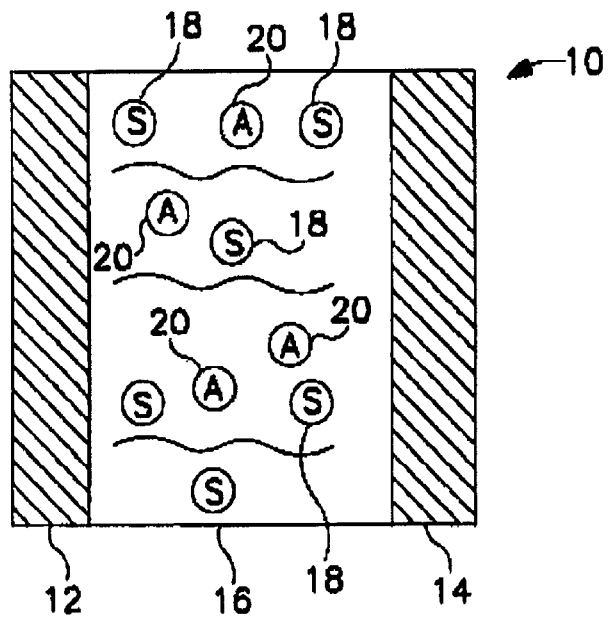
FIG. 1 of the drawings is a schematic representation of a prior art electrochemical cell prior to an initial charge.

While this invention is susceptible of embodiment in many different forms, there is shown in the drawings and will herein be described in detail several embodiments with the understanding that the present disclosure is to be considered as an exemplification of the principles of the invention and is not intended to limit the invention to the embodiments illustrated.

Prior art electrochemical cell 10 is shown in FIG. 1, prior to an application of an electrical charge, as generally comprising first (carbonaceous) electrode 12, second electrode 14, and electrolyte 16. Electrolyte 16 includes solvent 18 and conventional additive 20.

Figure 2:
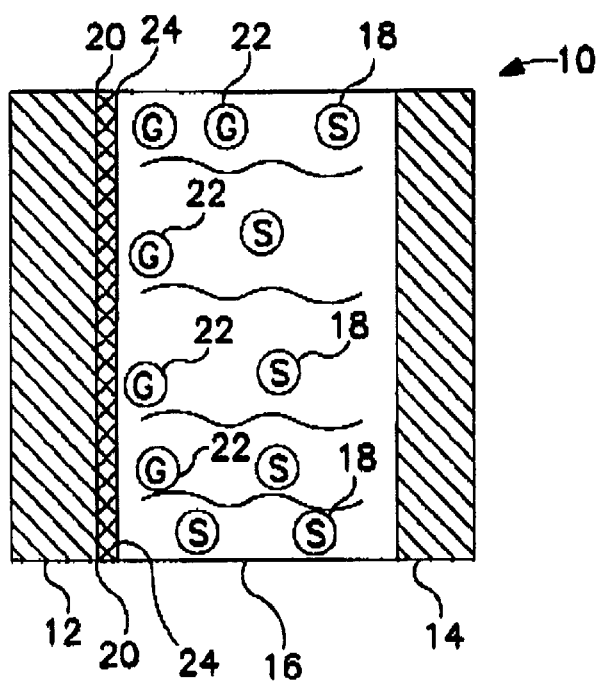
FIG. 2 of the drawings is a schematic representation of a prior art electrochemical cell sub subsequent to an initial charge.

Prior art electrode 10 is shown in FIG. 2, subsequent to an initial electrical charge as generally comprising first electrode 12, second electrode 14, electrolyte 16 and passivating layer 20'. Passivating layer 20' is formed, in part, upon interaction of the conventional additive with the carbonaceous electrode—prior to interaction by the solvent in the electrolyte. Although such a passivating layer substantially blocks the solvent from contact with the carbonaceous electrode, it will, unfortunately, generate significant amounts of gas as it begins to decompose during cell cycling and storage.

Figure 3:
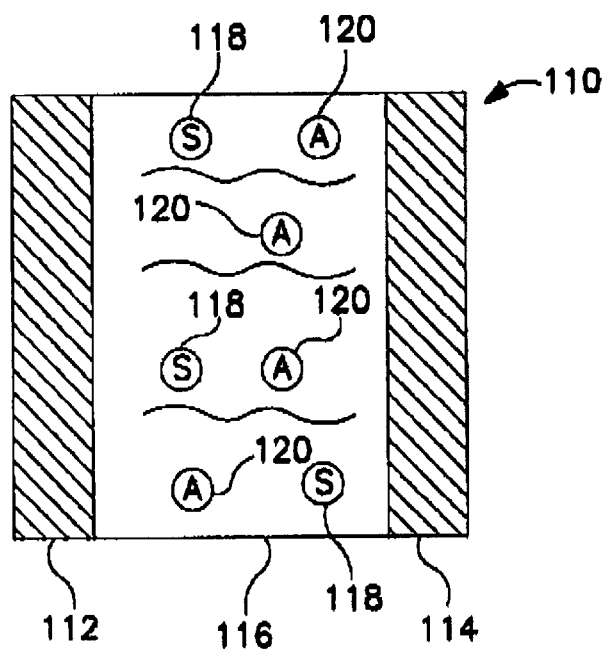
FIG. 3 of the drawings is a schematic representation of an electrochemical cell in accordance with the present invention prior to an initial charge.

Electrochemical cell 110 of the present invention is shown in FIG. 3 prior to application of an initial electrical charge, as generally comprising first electrode 112 having a carbonaceous surface 126, second electrode 114, and electrolyte 116. Electrolyte 116 includes solvent 118 and additive 120. While additive 120 is shown, for illustrative purposes only, as initially associated with electrolyte 116, it is also contemplated that additive 120 be associated with either one, or both of the first and second electrodes 112 and 114, respectively. For example, when the desired additive is substantially insoluble in the electrolyte, such as when the additive is a 3-3'-diphthalide, the additive will be initially associated with an electrode. Such association can be accomplished by any number of conventional techniques including, but not limited to spraying, rolling, coating or by mixing the additive with the active material prior to application onto an associated current collector. When an additive which is substantially soluble with the electrolyte, such as succinic anhydride, is to be utilized, then it can be mixed with the electrolyte at almost any time, also using conventional mixing techniques.

Furthermore, while additive 120 will be exemplified in the experiments discussed in detail below as generally comprising anhydrides, diphthalides, multi-dentate complexing agents, and several other organic compounds, it will be understood that such disclosure to specific compounds is merely illustrative of acceptable additives, and is by no means intended to be an exhaustive compilation of all suitable additives. Indeed, it will be understood that acceptable additives exhibit the following characteristics: 1) they can be either soluble or insoluble with the associated electrolyte prior to reduction, yet substantially insoluble with the electrolyte after reduction; 2) they can be modified to a reduced state substantially without forming a gas; 3) they form a passivating layer on the surface of a carbonaceous electrode so as to substantially block the solvent within the electrolyte from contacting the carbonaceous surface, and, in turn, from decomposing and generating a gas as would otherwise occur upon interaction between the solvent and the carbonaceous material; and 4) they result in a cell with an increase in first cycle coulombic efficiency relative to a cell without such an additive. Exemplars of just some of such additives exhibiting the above-identified properties include, but are in no way limited to CPDA, EDTDA, THPA, and CA—each of which have the following respective chemical formula:

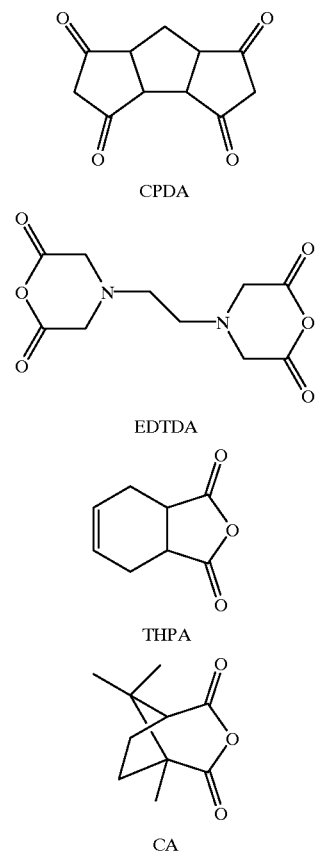

CPDA

EDTDA

THPA

CA

It will be understood that diphthalides may be preferred for certain applications inasmuch as they are inherently insoluble in the solvent of the electrolyte prior to reduction. Such an insolubility allows for selective deposition of the additive on a desired electrode without the additive interfering with any processes of the other electrode. Additionally, selective deposition with such an additive allows for precise control of the additive concentration at the additive/electrolyte interface.

It will be further understood that additives capable of forming a multi-dentate complex with lithium, such as, CPDA and EDTDA are highly preferred. Of course, other additives capable of forming multi-dentate complexes with lithium and other cations known to those having ordinary skill in the art are likewise contemplated for use.

Also, for purposes of the present disclosure, solvent 118 will be identified as comprising an organic carbonate solvent, such as propylene carbonate (PC) or ethylene carbonate (EC), although other commercially available and conventionally used solvents or electrochemical systems (such as liquid, polymer, gel, and plastic) as would be readily understood to those having ordinary skill in the art having the present disclosure before them, are likewise contemplated for use.

Figure 4:
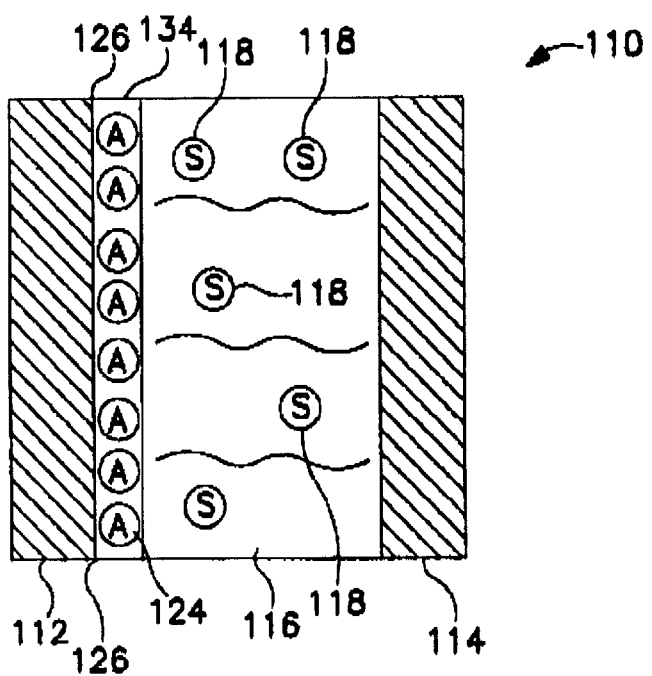
FIG. 4 of the drawings is a schematic representation of an electrochemical cell in accordance with the present invention subsequent to an initial charge.

Electrochemical cell 100 is shown in FIG. 4, subsequent to application of an initial charge, as including passivating layer 124 on carbonaceous surface 126 of first electrode 112. As will be explained in greater detail, the passivating layer forms as a result of reducing the additive adjacent the interface between electrolyte 116 and carbonaceous surface 126 of first electrode 112. As previously explained, such a passivating layer will substantially block solvent 118 from contacting the carbonaceous surface 126 and, in turn, substantially preclude the generation of gas which would otherwise result from decomposition of the solvent. As also explained, even though the additive itself will eventually decompose, such decomposition will not result in the generation of any significant, if any, gas. Accordingly, it has been found that not only is gas generation substantially eliminated, but, that the cells first cycle coulombic efficiency can be impressively increased as compared to cells which were fabricated without an additive of the present invention. Details relating to such efficiency will be discussed in greater detail below.

Figure 5:
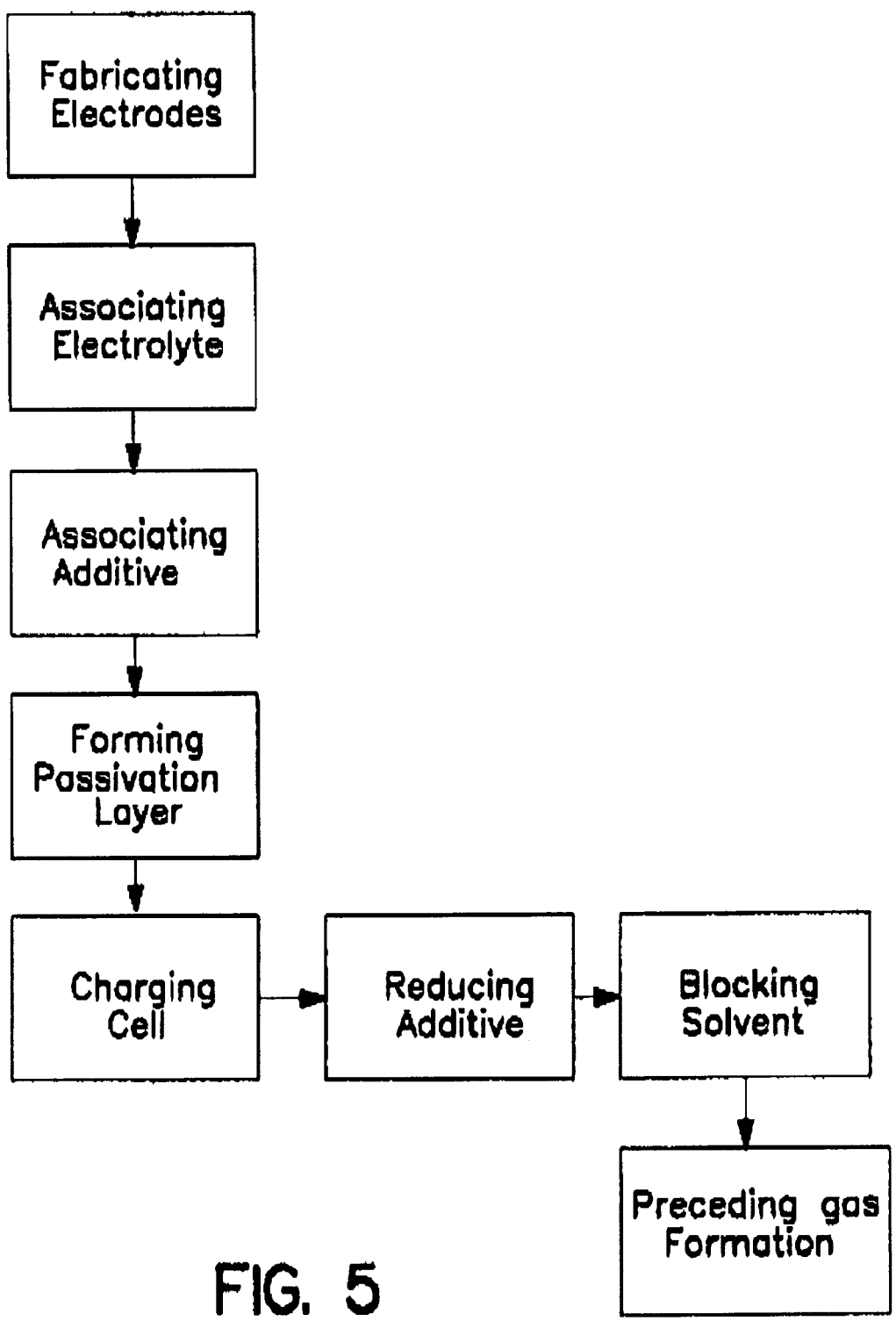
FIG. 5 of the drawings is a flow chart of the chemical process of the present invention.

The process associated with the manufacture of electrochemical cell 110 (FIGS. 3 and 4), as well as the actual chemical process which occurs within the cell upon initial electrical charging, is identified in FIG. 5, as including the following steps: First, the initial cell is manufactured by fabricating first electrode 112, second electrode 114, and electrolyte 116. For purposes of the present disclosure, first electrode 112 will comprise an anode having a carbonaceous surface 126, and second electrode 114 will comprise a cathode. Of course, in a secondary cell configuration, the anode and cathode will become interchangeable with each other, depending on whether the cell is charging or discharging. The particular electrolyte, as well as the electrodes, will be fabricated using conventional techniques. Additionally, solvent 118 and additive 120, may initially be associated with electrolyte 116. However, as previously explained, additive 120 may alternatively, or likewise, be associated with one or both of electrodes 112 and 114, respectively.

After electrochemical cell 110 has been fabricated, passivating layer 124 is formed by applying an initial charge to the cell. After the initial charge is applied, additive 120 is reduced near the interface between carbonaceous surface 126 of first electrode 112 and electrolyte 116. The term "reduced" is understood not only to be a formal reduction, but also as any alteration from the additive's original, pre-reduced state. Such a reduction includes any modification to the chemical structure of the additive so that it is at least substantially insoluble within the electrolyte 116, or, alternatively, associated with the carbonaceous electrode/anode.

The passivating layer substantially blocks solvent 118 in electrolyte 116 from contact with the carbonaceous surface. Accordingly, such blocking substantially precludes solvent decomposition, and, more particularly, gas formation within electrochemical cell 110. Furthermore, while reduced additive 120 and, in turn, passivating layer 124, will eventually decompose during cell cycling and storage, such decomposition will be substantially devoid of any gas generation.

Inasmuch as solvent decomposition, which would otherwise occur upon contact with the carbonaceous surface, and decomposition of a conventional additive, results in a substantial loss of coulombic efficiency, it has been found that the use of an additive of the present invention results in an electrochemical cell having a first cycle coulombic efficiency substantially greater than a cell with out such an additive.

Indeed, in support of such an increase in electrochemical performance, several electrochemical cells were fabricated using various additives which were subsequently characterized. The experimental method and results are summarized herein below.

First, several electrochemical cells were fabricated wherein, the cells comprised a graphite based anode on a copper current collector, a lithium metal cathode with a lithium metal reference electrode, and an additive (0.5–5.0% by wt.) in a 1M $LiAsF_6$ PC electrolyte solution. Once fabricated, cyclic voltammetry was used to measure how efficiently the additive formed the passivation layer within the electrochemical cell. The fabricated cells were cycled from 3.0 volts down to 0.0 volts in a stepped fashion. The voltammetry results are summarized below in Table 1.0, wherein the third column reveals the capacity (in coulombs) which were sacrificed to form the passivation layer. A number approaching 0.0 is preferred. The final column gives the fist cycle coulombic efficiency of the cell, which equals the % capacity retained after forming the passivation layer. A number approaching 100% is preferred.

TABLE 1.0

| Experiment | Additive | Sac Cap (coulombs) | $1^{st}$ Cycle Coulombic Efficiency (%) |
|---|---|---|---|
| 1 | None | 0.37 | 23.0 |
| 2 | CPDA | 0.46 | 70.0 |
| 3 | THPA | 0.16 | 70.0 |
| 4 | EDTDA | 0.14 | 69.0 |
| 5 | SA* | 0.16 | 58.0 |
| 6 | CA | 0.12 | 54.0 |
| 7 | DSA* | 0.21 | 56.0 |
| 8 | STYRENE* | 0.26 | 50.0 |
| 9 | BEC* | 0.24 | 62.0 |
| 10 | DIP* | N/A | 60.0 |

*The chemical formula is provided below in Table 2.0

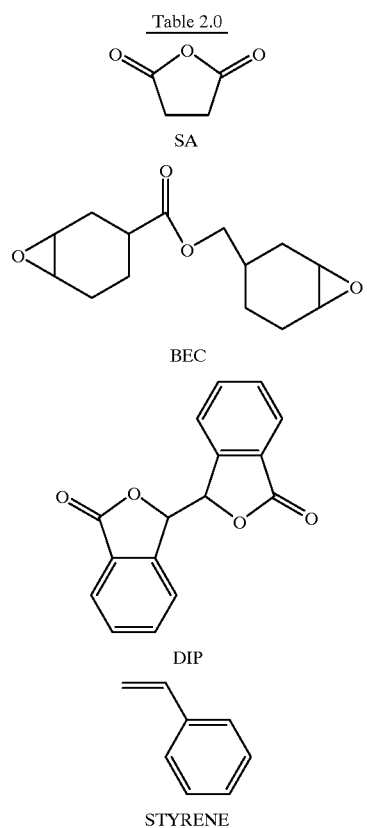

Table 2.0

SA

BEC

DIP

STYRENE

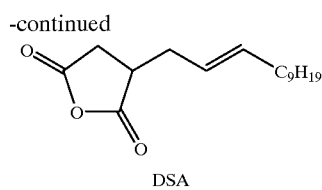

DSA

As can be seen CPDA, THPA and EDTDA exhibited extremely favorable values for both sacrificed capacity and first cycle coulombic efficiency. In particular, THPA (Experiment 3) resulted in a cell with an increase in first cycle coulombic efficiency of almost 200% and a reduction in sacrificed capacity of almost 100% compared to a cell without an additive (Experiment 1).

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An electrochemical cell having a controlled electrode surface comprising:
    a first electrode and a second electrode wherein at least one of the first and second electrodes includes a carbonaceous surface;
    an electrolyte including at least one solvent;
    a reduced additive associated with the carbonaceous surface of at least one of the first and second electrodes, wherein the reduced additive is at least one of substantially insoluble in the electrolyte or associated with the carbonaceous surface of the electrode, and, wherein the reduced additive includes an additive which is either soluble or insoluble in the electrolyte prior to reduction;
    passivating means including at least one of the additive and reduced additive for substantially precluding contact between the at least one solvent of the electrolyte and the carbonaceous surface of at least one of the first and second electrodes to, in turn, substantially prevent gas formation within the cell, which would otherwise result from decomposition of the solvent upon contact with the carbonaceous surface; and
    means associated with at least one of the additive and reduced additive for substantially precluding gas formation within the electrochemical cell as a result of decomposition of the additive or reduced additive at the electrode with the carbonaceous surface during cell cycling and storage.

2. The electrochemical cell according to claim 1, wherein the reduced additive includes a multi-dentate complex with at least one metal cation.

3. The electrochemical cell according to claim 2, wherein the at least one metal cation is Li$^+$.

4. The electrochemical cell according to claim 1, wherein the reduced additive is insoluble in the electrolyte.

5. The electrochemical cell according to claim 1, wherein the additive is applied directly onto the carbonaceous surface of the at least one electrode.

6. A process for manufacturing an electrochemical cell comprising the steps of:
    fabricating a first and a second electrode wherein at least one of the electrodes includes a carbonaceous surface;
    associating at least one electrolyte, having at least one solvent, with the first and second electrodes; and
    associating either an insoluble or soluble additive with at least one of the electrolyte or the at least one electrode with the carbonaceous surface, wherein the additive is insoluble with the electrolyte in its reduced state.

7. The process according to claim 6, wherein the manufactured electrochemical cell exhibits a first cycle coulombic efficiency greater than 23%.

8. The process according to claim 6, wherein the reduced additive includes a multi-dentate complex with at least one metal cation.

9. The process according to claim 8, wherein the at least one metal cation is Li$^+$.

10. The process according to claim 6, wherein additive is insoluble in the electrolyte.

11. The process according to claim 10, wherein the additive is applied directly onto the carbonaceous surface of the at least one electrode.

12. A chemical process for an electrochemical cell comprising the steps of:
    fabricating a first and a second electrode wherein at least one of the electrodes includes a carbonaceous surface;
    associating at least one electrolyte, having at least one solvent, with the first and second electrodes;
    associating either an insoluble or soluble additive with at least one of the electrolyte or the at least one electrode with the carbonaceous surface, wherein the additive is insoluble with the electrolyte in its reduced state; and
    forming a passivating layer between the carbonaceous surface of the at least one electrode and the electrolyte;
    wherein the step of forming the passivating layer includes the steps of:
    charging the electrochemical cell;
    reducing the additive at the carbonaceous surface so that the reduced additive is substantially insoluble with the electrolyte;
    blocking the at least one solvent in the electrolyte from chemical interaction with the carbonaceous surface of the at least one electrode; and
    substantially precluding gas formation within the electrochemical cell as a result of decomposition of at least one of the additive and reduced additive during cell cycling and storage.

13. The chemical process according to claim 12, wherein the electrochemical cell exhibits a first cycle coulombic efficiency greater than 23%.

14. The chemical process according to claim 12, wherein the reduced additive includes a multi-dentate complex with at least one metal cation.

15. The process according to claim 14, wherein the at least one metal cation is Li$^+$.

16. The process according to claim 12, wherein additive is insoluble in the electrolyte.

17. The process according to claim 16, wherein the additive is applied directly onto the carbonaceous surface of the at least one electrode.

* * * * *